United States Patent
Bajic et al.

(10) Patent No.: US 7,052,091 B2
(45) Date of Patent: May 30, 2006

(54) AUTOMOTIVE VEHICLE SEAT INSERT

(75) Inventors: Goran Bajic, Windsor (CA); Lindy Brennan, Kingsville (CA); Brennon Lewis White, Commerce Township, MI (US); Anne Patrice Liss, Livonia, MI (US); Lucas Fernandez, Windsor (CA); Valerija Drobnjakovic, LaSalle (CA); Marinko Lazanja, Windsor (CA)

(73) Assignees: W.E.T. Automotive Systems Ltd., Windsor; Johnson Controls Technology Company, Plymouth, MI (US)

( * ) Notice: Subject to any disclaimer, the term of this patent is extended or adjusted under 35 U.S.C. 154(b) by 0 days.

(21) Appl. No.: 11/043,600

(22) Filed: Jan. 26, 2005

(65) Prior Publication Data

US 2005/0127723 A1    Jun. 16, 2005

Related U.S. Application Data

(63) Continuation of application No. 10/434,890, filed on May 9, 2003, now Pat. No. 6,893,086.

(60) Provisional application No. 60/433,270, filed on Dec. 13, 2002, provisional application No. 60/393,815, filed on Jul. 3, 2002.

(51) Int. Cl.
*A47C 7/02* (2006.01)
*A47C 7/72* (2006.01)

(52) U.S. Cl. .......................... 297/452.43; 297/180.11; 297/180.12

(58) Field of Classification Search ........... 297/180.14, 297/180.12, 180.13, 180.11, 452.43
See application file for complete search history.

(56) References Cited

U.S. PATENT DOCUMENTS

| | | | |
|---|---|---|---|
| 374,424 A | 12/1887 | Ober |
| 390,154 A | 9/1888 | Beach |
| 1,370,832 A | 3/1921 | Mollberg |
| 1,439,681 A | 12/1922 | Alkire et al. |
| 1,475,912 A | 11/1923 | Williams |
| 1,514,329 A | 11/1924 | Metcalf |
| 1,537,460 A | 5/1925 | Campbell et al. |
| 1,541,213 A | 6/1925 | Harley |
| 1,593,066 A | 7/1926 | Gaston |
| 1,664,636 A | 4/1928 | Mayer |
| 1,837,515 A | 12/1931 | Bachrach |
| 1,936,960 A | 11/1933 | Bowman |
| 2,022,959 A | 12/1935 | Gordon |
| 2,103,553 A | 12/1937 | Reynolds |

(Continued)

FOREIGN PATENT DOCUMENTS

DE    37 05 756 A1    10/1988

(Continued)

OTHER PUBLICATIONS

Komfortable bei jeder Temperatur.

(Continued)

*Primary Examiner*—Peter M. Cuomo
*Assistant Examiner*—Sarah B. McPartlin
(74) *Attorney, Agent, or Firm*—Dobrusin & Thennisch PC (57) ABSTRACT

There is disclosed an insert suitable for placement within a seat of an automotive vehicle. The insert preferably includes multiple layers, one of which includes a heater for providing an occupant of the seat with warmth. The insert also preferably includes a blower or air pump for providing ventilation and/or cooling to the seat occupant.

48 Claims, 4 Drawing Sheets

U.S. PATENT DOCUMENTS

| | | |
|---|---|---|
| 2,158,801 A | 5/1939 | Petterson |
| 2,336,089 A | 12/1943 | Gould |
| 2,493,303 A | 1/1950 | McCullough |
| 2,544,506 A | 3/1951 | Kronhaus |
| 2,703,134 A | 3/1955 | Mossor |
| 2,749,906 A | 6/1956 | O'Connor |
| 2,758,532 A | 8/1956 | Awe |
| 2,782,834 A | 2/1957 | Vigo |
| 2,791,956 A | 5/1957 | Guest |
| 2,826,135 A | 3/1958 | Benzick |
| 2,912,832 A | 11/1959 | Clark |
| 2,931,286 A | 4/1960 | Fry, Sr. et al. |
| 2,976,700 A | 3/1961 | Jackson |
| 2,978,972 A | 4/1961 | Hake |
| 2,992,604 A | 7/1961 | Trotman et al. |
| 2,992,605 A | 7/1961 | Trotman et al. |
| 3,030,145 A | 4/1962 | Kottemann |
| 3,101,037 A | 8/1963 | Taylor |
| 3,101,660 A | 8/1963 | Taylor |
| 3,127,931 A | 4/1964 | Johnson |
| 3,131,967 A | 5/1964 | Spaulding |
| 3,136,577 A | 6/1964 | Richard |
| 3,137,523 A | 6/1964 | Karner |
| 3,162,489 A | 12/1964 | Trotman |
| 3,209,380 A | 10/1965 | Watsky |
| 3,486,177 A | 12/1969 | Marshack |
| 3,529,310 A | 9/1970 | Olmo |
| 3,550,523 A | 12/1970 | Segal |
| 3,552,133 A | 1/1971 | Lukomsky |
| 3,613,129 A | 12/1971 | Hellig |
| 3,638,255 A | 2/1972 | Sterrett |
| 3,653,589 A | 4/1972 | McGrath |
| 3,653,590 A | 4/1972 | Elsea |
| 3,681,797 A | 8/1972 | Messner |
| 3,684,170 A | 8/1972 | Roof |
| 3,732,944 A | 5/1973 | Kendall |
| 3,736,022 A | 5/1973 | Radke |
| 3,738,702 A | 6/1973 | Jacobs |
| 3,757,366 A | 9/1973 | Sacher |
| 3,770,318 A | 11/1973 | Fenton |
| 3,778,851 A | 12/1973 | Howorth |
| 3,948,246 A | 4/1976 | Jenkins |
| 4,002,108 A | 1/1977 | Drori |
| 4,043,544 A | 8/1977 | Ismer |
| 4,060,276 A | 11/1977 | Lindsay |
| 4,065,936 A | 1/1978 | Fenton et al. |
| 4,072,344 A | 2/1978 | Li |
| 4,141,585 A | 2/1979 | Blackman |
| 4,175,297 A | 11/1979 | Robbins et al. |
| 4,245,149 A * | 1/1981 | Fairlie ........................ 219/528 |
| 4,259,896 A | 4/1981 | Hayashi et al. |
| 4,268,272 A * | 5/1981 | Taura .......................... 44/253 |
| 4,335,725 A | 6/1982 | Geldmacher |
| 4,379,352 A | 4/1983 | Hauslein et al. |
| 4,391,009 A | 7/1983 | Schild et al. |
| 4,413,857 A | 11/1983 | Hayashi |
| 4,509,792 A | 4/1985 | Wang |
| 4,563,387 A | 1/1986 | Takagi et al. |
| 4,572,430 A | 2/1986 | Takagi et al. |
| 4,589,656 A | 5/1986 | Baldwin |
| 4,665,707 A | 5/1987 | Hamilton |
| 4,671,567 A | 6/1987 | Frobose |
| 4,685,727 A | 8/1987 | Cremer et al. |
| 4,712,832 A | 12/1987 | Antolini et al. |
| 4,729,598 A | 3/1988 | Hess |
| 4,777,802 A | 10/1988 | Feher |
| 4,847,933 A | 7/1989 | Bedford |
| 4,853,992 A | 8/1989 | Yu |
| 4,866,800 A | 9/1989 | Bedford |
| 4,905,475 A | 3/1990 | Tuomi |
| 4,923,248 A | 5/1990 | Feher |
| 4,946,220 A | 8/1990 | Wyon et al. |
| 4,981,324 A | 1/1991 | Law |
| 4,997,230 A | 3/1991 | Spitalnick |
| 5,002,336 A | 3/1991 | Feher |
| 5,004,294 A | 4/1991 | Lin |
| 5,016,302 A | 5/1991 | Yu |
| 5,076,643 A | 12/1991 | Colasanti et al. |
| 5,102,189 A | 4/1992 | Saito et al. |
| 5,106,161 A | 4/1992 | Meiller |
| 5,117,638 A | 6/1992 | Feher |
| 5,160,517 A | 11/1992 | Hicks et al. |
| 5,211,697 A | 5/1993 | Kienlein et al. |
| 5,226,188 A | 7/1993 | Liou |
| 5,292,577 A | 3/1994 | Van Kerrebrouck et al. |
| 5,335,381 A | 8/1994 | Chang |
| 5,354,117 A | 10/1994 | Danielson et al. |
| 5,356,205 A | 10/1994 | Calvert et al. |
| 5,370,439 A | 12/1994 | Lowe et al. |
| 5,372,402 A | 12/1994 | Kuo |
| 5,382,075 A | 1/1995 | Shih |
| 5,385,382 A | 1/1995 | Single, II et al. |
| 5,403,065 A | 4/1995 | Callerio |
| 5,408,711 A | 4/1995 | McClelland |
| 5,411,318 A * | 5/1995 | Law ..................... 297/452.45 |
| 5,416,935 A | 5/1995 | Nieh |
| 5,516,189 A | 5/1996 | Ligeras |
| 5,524,439 A * | 6/1996 | Gallup et al. .................. 62/3.5 |
| 5,561,875 A | 10/1996 | Graebe |
| 5,590,428 A | 1/1997 | Roter |
| 5,597,200 A | 1/1997 | Gregory et al. |
| 5,613,729 A | 3/1997 | Summer, Jr. |
| 5,613,730 A | 3/1997 | Buie et al. |
| 5,626,021 A | 5/1997 | Karunasiri et al. |
| 5,626,386 A | 5/1997 | Lush |
| 5,626,387 A | 5/1997 | Yeh |
| 5,639,145 A * | 6/1997 | Alderman .............. 297/452.45 |
| 5,645,314 A | 7/1997 | Liou |
| 5,692,952 A | 12/1997 | Chih-Hung |
| 5,715,695 A | 2/1998 | Lord |
| 5,787,534 A | 8/1998 | Hargest et al. |
| 5,833,309 A | 11/1998 | Schmitz |
| 5,833,321 A | 11/1998 | Kim et al. |
| 5,897,162 A | 4/1999 | Humes et al. |
| 5,902,014 A * | 5/1999 | Dinkel et al. .......... 297/452.43 |
| 5,918,930 A | 7/1999 | Kawai et al. |
| 5,921,314 A | 7/1999 | Schuller et al. |
| 5,921,858 A | 7/1999 | Kawai et al. |
| 5,924,766 A | 7/1999 | Esaki et al. |
| 5,924,767 A | 7/1999 | Pietryga |
| 5,927,817 A | 7/1999 | Ekman et al. |
| 5,934,748 A * | 8/1999 | Faust et al. ............. 297/180.12 |
| 6,003,950 A * | 12/1999 | Larsson ................ 297/452.42 |
| 6,019,420 A | 2/2000 | Faust et al. |
| 6,048,024 A * | 4/2000 | Wallman ............... 297/180.14 |
| 6,059,018 A * | 5/2000 | Yoshinori et al. ............. 165/42 |
| 6,059,362 A | 5/2000 | Lin |
| 6,062,641 A * | 5/2000 | Suzuki et al. ............ 297/180.1 |
| 6,064,037 A | 5/2000 | Weiss et al. |
| 6,068,332 A | 5/2000 | Faust et al. |
| 6,079,485 A | 6/2000 | Esaki et al. |
| 6,085,369 A | 7/2000 | Feher |
| 6,105,667 A | 8/2000 | Yoshinori et al. |
| 6,124,577 A | 9/2000 | Fristedt |
| 6,147,332 A | 11/2000 | Holmberg et al. |
| 6,179,706 B1 | 1/2001 | Yoshinori et al. |
| 6,186,592 B1 * | 2/2001 | Orizaris et al. ........ 297/180.12 |
| 6,189,966 B1 | 2/2001 | Faust et al. |
| 6,196,627 B1 | 3/2001 | Faust et al. |
| 6,273,810 B1 | 8/2001 | Rhodes et al. |
| 6,277,023 B1 | 8/2001 | Schwartz |
| 6,278,090 B1 | 8/2001 | Fristedt et al. |
| 6,291,803 B1 | 9/2001 | Fourrey |
| 6,300,150 B1 | 10/2001 | Venkatasubramanian |

| | | |
|---|---|---|
| 6,481,801 B1 | 11/2002 | Schmale |
| 6,505,886 B1 | 1/2003 | Gielda et al. |
| 6,511,125 B1 | 1/2003 | Gendron |
| 6,539,725 B1 | 4/2003 | Bell |
| RE38,128 E | 6/2003 | Gallup et al. |
| 6,578,910 B1 | 6/2003 | Andersson et al. |
| 6,592,181 B1 * | 7/2003 | Stiller et al. ............. 297/218.2 |
| 6,598,405 B1 | 7/2003 | Bell |
| 6,619,736 B1 | 9/2003 | Stowe et al. |
| 6,625,990 B1 | 9/2003 | Bell |
| 6,626,488 B1 * | 9/2003 | Pfahler .................. 297/180.11 |
| 6,629,724 B1 | 10/2003 | Ekern et al. |
| 6,629,725 B1 * | 10/2003 | Kunkel et al. ......... 297/180.12 |
| 6,722,148 B1 | 4/2004 | Aoki et al. |
| 6,786,541 B1 | 9/2004 | Haupt et al. |
| 6,808,230 B1 | 10/2004 | Buss et al. |
| 6,817,675 B1 | 11/2004 | Buss et al. |
| 6,828,528 B1 | 12/2004 | Stowe et al. |
| 6,857,697 B1 | 2/2005 | Brennan et al. |
| 6,869,139 B1 | 3/2005 | Brennan et al. |
| 6,893,086 B1 | 5/2005 | Bajic et al. |
| 6,976,734 B1 | 12/2005 | Stoewe |
| 2001/0035669 A1 | 11/2001 | Andersson et al. |
| 2002/0003363 A1 | 1/2002 | Buss et al. |
| 2002/0017102 A1 | 2/2002 | Bell |
| 2002/0092308 A1 | 7/2002 | Bell |
| 2002/0096915 A1 * | 7/2002 | Haupt et al. ........... 297/180.13 |
| 2002/0096931 A1 * | 7/2002 | White et al. ........... 297/452.42 |
| 2002/0105213 A1 | 8/2002 | Rauh et al. |
| 2002/0108381 A1 | 8/2002 | Bell |
| 2002/0139123 A1 | 10/2002 | Bell |
| 2002/0140258 A1 | 10/2002 | Ekern et al. |
| 2002/0148234 A1 | 10/2002 | Bell |
| 2002/0148235 A1 | 10/2002 | Bell |
| 2002/0148236 A1 | 10/2002 | Bell |
| 2002/0150478 A1 | 10/2002 | Aoki |
| 2003/0005706 A1 | 1/2003 | Bell |
| 2003/0024924 A1 | 2/2003 | Fristedt |
| 2003/0029173 A1 | 2/2003 | Bell et al. |
| 2003/0079770 A1 | 5/2003 | Bell |
| 2003/0084935 A1 | 5/2003 | Bell |
| 2003/0102699 A1 | 6/2003 | Aoki et al. |
| 2003/0150229 A1 | 8/2003 | Aoki et al. |
| 2004/0118555 A1 * | 6/2004 | Fristedt et al. .............. 165/202 |

FOREIGN PATENT DOCUMENTS

| | | |
|---|---|---|
| DE | 41 12 631 | 4/1992 |
| DE | 197 36 951 A1 | 3/1999 |
| DE | 197 37 636 | 3/1999 |
| DE | 198 10 936 C2 | 6/1999 |
| DE | 198 10 936 A1 | 9/1999 |
| DE | 199 20 451 A1 | 12/1999 |
| DE | 199 54 97 | 1/2001 |
| DE | 199 54 978 C1 | 1/2001 |
| DE | 100 01 314 A1 | 7/2001 |
| DE | 100 24 880 C1 | 9/2001 |
| EP | 0 128 534 | 12/1984 |
| EP | 0 280 213 | 8/1988 |
| EP | 0 517 615 | 12/1992 |
| EP | 0 517 615 A1 | 12/1992 |
| EP | 0 936 105 A1 | 8/1999 |
| EP | 0 730 720 | 7/2000 |
| EP | 1 075 984 A2 | 2/2001 |
| EP | 1 075 984 B1 | 5/2003 |
| FR | 1266925 | 9/1960 |
| FR | 2 599 683 | 6/1986 |
| FR | 2 630 056 | 4/1988 |
| FR | 2 630 056 | 10/1989 |
| FR | 2 694 527 | 2/1994 |
| JP | 1171509 | 7/1989 |
| JP | 5-277020 | 10/1993 |
| JP | 10044756 | 2/1998 |
| JP | 2002125801 | 5/2002 |
| JP | 2003042594 | 2/2003 |
| WO | WO94/09684 | 5/1994 |
| WO | WO97/09908 | 3/1997 |
| WO | WO 02/06914 A1 | 1/2002 |
| WO | WO 03/015583 A2 | 2/2003 |

OTHER PUBLICATIONS

Excerpt from website http://www.seatcomfort.com/semashow1.htm, Specializing in Seat Ventilation and Heating Systems, Seat Comfort Systems Unveils 3 New Seat Heater Products.

Excerpt from website http://www.seatcomfort.com/ventilation.htm, Specializing in Seat Ventilation and Heating Systems, Ventilation.

Excerpt from website http://www.i-car.com/html_pages/about_icar/current_events_news/advantage/advantage I-Car Advantage Online.

International Search Report for Application Ser. No. PCT/US03/19929 dated Oct. 10, 2003.

Copending U.S. Appl. No. 09/755,506 filed Jan. 5, 2001.
Copending U.S. Appl. No. 09/755,637 filed Jan. 5, 2001.
Copending U.S. Appl. No. 09/755,505 filed Jan. 5, 2001.
Copending U.S. Appl. No. 10/463,052 filed Jun. 17, 2003.
Copending U.S. Appl. No. 09/619,171 filed Jul. 19, 2000.

Automotive Seat Heating Systems, Bauerhin International, received by Assignee W.E.T. Automotive Systems on or about May 2002.

Seat Heating Systems, Kongsberg Automotive, believed to be from websitehttp://www.kongsberg-automotive.no/.

Automotive Heated Seats—Heated Steering Wheels, IGB Automotive Ltd., received by Assignee W.E.T. Automotive Systems on or about May 2003.

GMT 830 Heating & Ventilation System, IGB Automotive Ltd., received by Assignee W.E.T. Automotive Systems on or about Jun. 2003.

* cited by examiner

AUTOMOTIVE VEHICLE SEAT INSERT

CLAIM OF PRIORITY

To the extent applicable, the present invention claims the benefit of the priority of U.S. Provisional Application Ser. No. 60/393,815, filed Jul. 3, 2002 and U.S. Provisional Application Ser. No. 60/433,270, filed Dec. 13, 2002, both of which are incorporated herein by reference for all purposes.

FIELD OF THE INVENTION

The present invention relates generally to automotive vehicle seats, and more particularly to an insert for providing heating, cooling, ventilation or a combination thereof to a seat of an automotive vehicle.

BACKGROUND OF THE INVENTION

For many years the transportation industry has been concerned with designing seats for automotive vehicles that provide added comfort to occupants in the seats. Various innovations in providing seating comfort are discussed in U.S. Pat. Nos. 6,064,037; 5,921,314; 5,403,065; 6,048,024 and 6,003,950, all of which are expressly incorporated herein by reference for all purposes. In addition, other innovations in providing seating comfort are discussed in U.S. patent application Ser. No. 09/619,171, filed Jul. 19, 2000, titled "Ventilated Seat Having a Pad Assembly and a Distribution Device"; U.S. patent application Ser. No. 09/755,505, filed Jan. 5, 2001, titled "Ventilated Seat"; and U.S. patent application Ser. No. 09/755,506, filed Jan. 5, 2001, titled "Portable Ventilated Seat", each of which are expressly incorporated herein by reference for all purposes. In the interest of continuing such innovation, the present invention provides an improved seating system, insert for a seat or both, which are preferably suitable for employment within or as part of an automotive vehicle seat and which assist in providing comfort control to an occupant in the seat.

SUMMARY OF THE INVENTION

According to the present invention, there is disclosed a seat insert, a method of forming the seat insert and a ventilated seat that is preferably suitable for an automotive vehicle. The insert preferably includes a forward layer, a rearward layer and a middle layer, although greater or fewer layers may be included. When included, the forward layer typically includes a first barrier sub-layer, a heater sub-layer, a plurality of openings or a combination thereof. In preferred embodiments, the first barrier sub-layer is formed of a plastic material, the heater sub-layer is formed as a lay-wire heater or both.

The rearward layer, when included, has a second barrier sub-layer, an opening or both. In a preferred embodiment, the second barrier sub-layer is formed of a plastic material like the first barrier sub-layer. The middle layer typically includes a spacer sub-layer defining an open space. In a preferred embodiment, the spacer sub-layer is formed of interwoven polymeric strand material. An air mover (e.g., a blower) is attached to the insert and is preferably at least partially disposed within the at least one opening of the rearward layer, although not required. The air mover is in fluid communication with the plurality of openings in the forward layer, the open space of the spacer sub-layer or both.

During formation of the insert, the first barrier sub-layer is preferably sealingly attached to the second barrier sub-layer about a periphery of the insert, although other attachments may be employed. The blower is preferably configured to pull air through the plurality of openings in the forward layer and through the open space of the spacer sub-layer, but it may also push air through these areas.

When assembled to a seat (e.g., a vehicle seat), the seat preferably includes a seat cushion component and a seat backrest component. At least one of the components is typically ventilated by the insert and each ventilated component typically includes an air-permeable trim surface at occupant contact areas of the seat. The insert is preferably located beneath the trim surface of each ventilated component.

BRIEF DESCRIPTION OF THE DRAWINGS

The features and inventive aspects of the present invention will become more apparent upon reading the following detailed description, claims and drawings, of which the following is a brief description:

DETAILED DESCRIPTION OF THE INVENTION

The present invention is predicated upon providing an insert suitable for placement within an automotive vehicle seat to provide heating, cooling, ventilation or a combination thereof to an occupant in the seat. The insert will include at least one layer, but preferably includes multiple (e.g., three) layers and each of the layers may include one or more sub-layers. For example, one of the layers preferably incorporates a heater or heater sub-layer into the insert. One or more of the layers also preferably incorporates a plastic film sub-layer for assisting in lamination of the layers, for providing a gas barrier or both. It is also preferable for one or more of the layers to provide a spacer sub-layer for providing open space within the insert. Additionally, a blower may be incorporated into the insert for providing fluid flow through the insert.

Referring to FIGS. 1 and 3–5, there is illustrated an exemplary insert 10 suitable for placement within a seat of an automotive vehicle. The insert 10 preferably includes a plurality of layers that may be separate but are preferably attached to each other to form the insert. In the embodiment shown, the insert 10 includes a first or forward layer 14 (e.g., the layer of the insert configured to be closest an occupant of the seat), a second or middle layer 16 and a third or rearward layer 20 (e.g., the layer of the insert configured to be furthest from the occupant of the seat).

Figure 1:
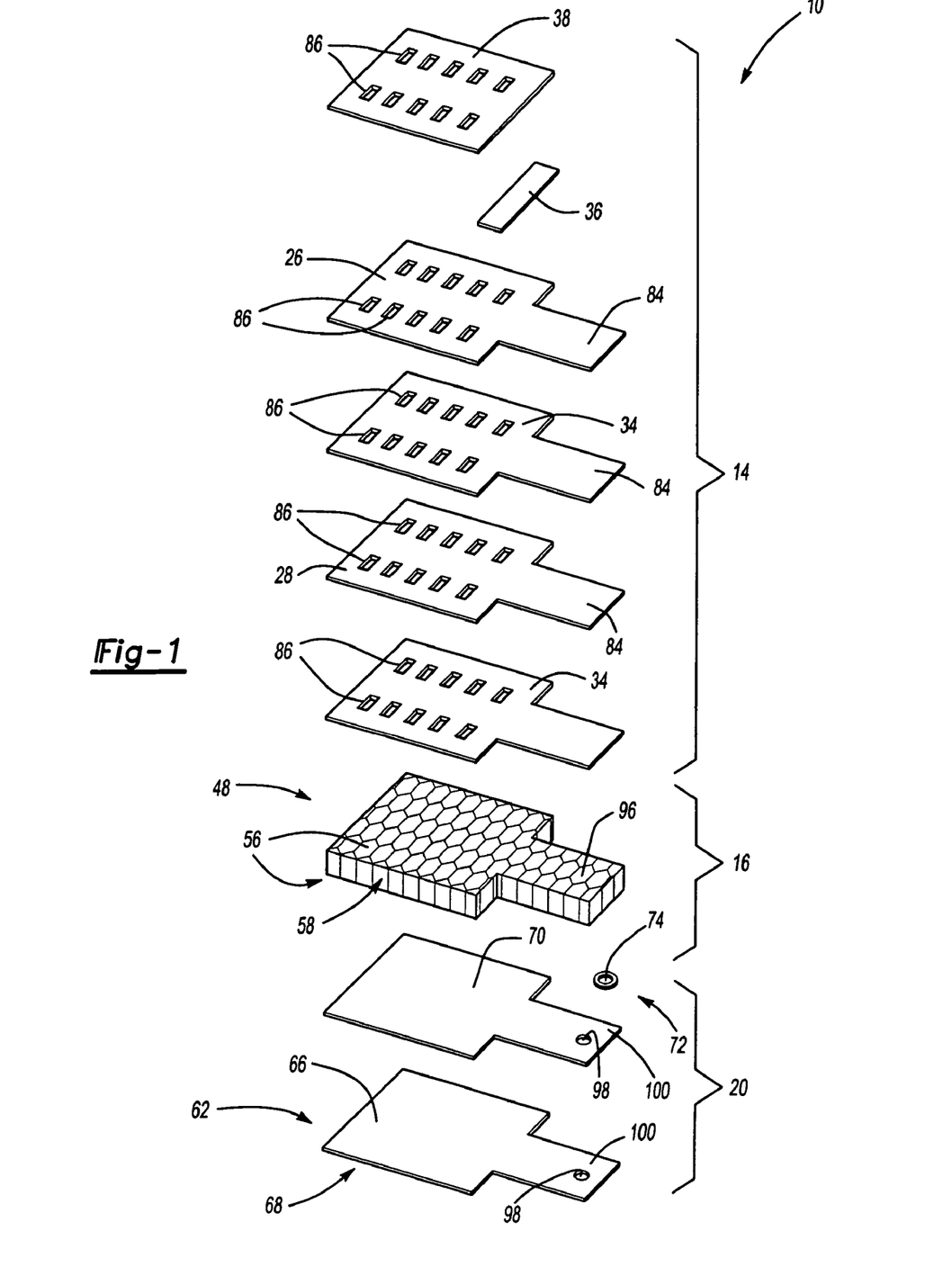
FIG. 1 is a blown up perspective view of a seat insert in accordance with an exemplary aspect of the present invention.

It is preferred that one of the layers 14, 16, 20 includes a heater. In the embodiment depicted, the forward layer 14 includes a heater sub-layer 26, which is preferably laminated to a gas barrier sub-layer 28 (e.g., a film, a textile or otherwise) although such film is not necessarily required. Various different types of heaters are suitable for incorporation into a car seat and it is contemplated that any of such heaters may be incorporated into the insert 10 of the present invention. Such heaters typically incorporate flexible electrical heating elements that are preferably thin, flat, non-obtrusive or a combination thereof. As examples, a lay-wire heater, a carbon fiber heater, a positive thermal coefficient (PTC) heater, a thermoelectric heater or the like, which are typically supported with a backing (e.g., a cloth or fabric type backing) may be used within the insert. In a preferred embodiment, the heater sub-layer 26 is a carbon fiber type heater with a backing (e.g., a nonwoven layer). One exemplary preferred heater is sold under the tradename CARBOTEX® and commercially available from W.E.T Automotive Systems, Inc. in Germany and/or FTG Fraser-Technik GmbH, Schleizer Strasse 56-58, D-95028 Hot/Saale, Germany. An example of such a heater is disclosed in U.S. Pat. 6,064,037, issued May 16, 2000, herein expressly incorporated by reference for all puposes.

When included, the barrier sub-layer 28 is typically formed of a plastic or polymeric material that softens or melts upon exposure to heat to assist the sub-layer 28 to adhere to one or more other layers or sub-layers. Alternatively, the barrier sub-layer 28 may be formed of fabrics, woven materials (e.g, goretex or microfibers), nylon, closed pore foam or other materials. Preferably, the barrier sub-layer 28 is substantially impermeable to fluids and particularly air such that the sub-layer 28 can assist in forming an air barrier as will be described further herein. Dimensionally, for a film barrier sub-layer, it is preferable for the film thickness to be about 0.1 mm to about 2.0 mm thick and more preferably about 0.7 mm to about 1.0 mm thick. Of course, it is contemplated that the film sub-layer 28 may have a variable thickness and may be outside of the aforementioned ranges.

The first layer 14 may also include one or more buffer sub-layers, one or more adhesives or adhesive sub-layers, one or more tape sub-layers, one or more porous foam layers or a combination thereof. Adhesive may be supplied in layers, drops or in a variety of other configurations. Preferably, the buffer layer is at least partially formed of an insulating material.

In the preferred embodiment depicted, the first layer 14 includes two adhesive sub-layers 34, one strip of tape 36 and one buffer sub-layer 38. The adhesive sub-layers 34 are preferably formed of a hot melt adhesive although not necessarily required. The adhesive may be provided as a web or otherwise and may be continuous or non continuous (e.g., may be applied in drops, dabs or the like). The adhesive sub-layers may include polyamides, polyesters, elastomers, urethanes, olefin polymers or a combination thereof. Moreover, the adhesives may be formulated as desired for particular processing parameters or conditions. Preferably, the adhesive sub-layers are substantially free of anti-blocking solutions, blowing additives, process contaminants or the like which might interfere with adhesive performance. As an example, one suitable hot melt adhesive is commercially available as a non-woven web under the tradename SPUNFAB® from Spunfab, Ltd. 175 Muffin Lane, Cuyahoga Falls, Ohio 44223.

The buffer sub-layer 38 in the embodiment depicted is a layer of gauze which is capable of protecting the heater layer 20 although various alternative protective materials may be used such as cloth, fleece or the like. The tape 36 is preferably tacky on two sides.

According to an alternative embodiment, it is contemplated that the first layer 14 may also include an air-permeable layer (not shown) between buffer sub-layer 38 and an occupant of the seat. The air-permeable layer, which may be any one of a variety of air-permeable materials (such as reticulated foam, for example) may be able to help distribute air under the occupant.

One of the layers 14, 16, 20, preferably the middle layer 16, includes a spacer sub-layer 48 formed of a spacer material. The spacer material may be provided as a variety of synthetic materials such as plastic or polymeric materials, padding and stuffing materials, lining and carrier materials or the like. Preferably, the spacer material creates a sub-layer 48 that functionally provides open space within the sub-layer while remaining at least partially pliable or flexible between the first and third layers 14, 20. As one example, the spacer sub-layer may be provided as a plurality of rubber, foam plastic or other members or fibers. The members or fibers are preferably spaced apart from each other to provide open space therebetween while still being close enough together to provide cushion and support. As another example the spacer sub-layer 48 may be formed of a 3-dimensional spacer fabric structure or material.

In the preferred embodiment depicted, the middle layer 16 includes only the spacer sub-layer 48, however, it is contemplated that additional sub-layers (e.g., adhesive sub-layers) or other materials (e.g., adhesives) may be incorporated into the middle layer 16. The particular sub-layer 48 shown is formed of polymeric (e.g., polyester) strand material that is interwoven to provide opposing honeycomb structures 56 (e.g., fabric panels), which are interconnected by several additional polymeric strand materials to provide open space 58 between the structures 56 while still providing cushion and support. As an example, one preferred material is sold under the tradename 3MESH® and is commercially available from Müller Textil GmbH, Germany or Müller Textiles, Inc., Rhode Island, USA.

In another of the layers 14, 16, 20 of the insert 10, preferably the rearward layer 20, there is included an outer protective or buffer sub-layer and another barrier sub-layer. In the embodiment shown, one integrated sub-layer 62 provides the both the barrier sub-layer 66 and the outer protective sub-layer 68 although they may be provided separately. The barrier sub-layer 66 for the rearward layer 20 may be the same or different than the barrier sub-layer 28 of the forward layer 14.

Preferably, the protective sub-layer 68 is formed of a fleece material, however, various other materials may be used such as gauze, cloth, fabric or the like. It is also preferable for the rearward layer 20 to include an adhesive or adhesive sub-layer 70 similar to or the same as those discussed in relation to the forward layer 14. According to a preferred embodiment, the adhesive sub-layer 70 is provided integrally with the integrated sub-layer 62.

In a highly preferred embodiment, an attachment component 72 is included in one of the layers 14, 16, 20. The attachment component 72 shown in FIG. 1 is a frame member that preferably defines an opening or through-hole 74. It is contemplated that the frame member may be in a variety of configurations (e.g., annular, rectangular, square, geometric or otherwise) and may be formed of a variety of preferably rigid or semi-rigid materials (metal, plastic or the like).

Notably, several of the materials of the various layers and sub-layers of the insert 10 may be environmentally friendly. For example, and without limitation, the materials of the spacer sub-layer 48, the buffer and protective sub-layers 38, 68 and the barrier sub-layers 28, 66 may be recyclable.

Assembly

Generally, for forming a vehicle seat insert according to the present invention, it is contemplated that the various layers and sub-layers of the insert as described above may be combined in a variety of sequences and according to a variety of protocols and technique. Thus, the order in which the various layers and sub-layers are combined and the techniques of combining should not in any way limit the present invention unless such order or techniques is specifically claimed. Moreover, it is also contemplated that there may be greater or fewer layers and that each layer may include greater or fewer sub-layers.

Figure 2:
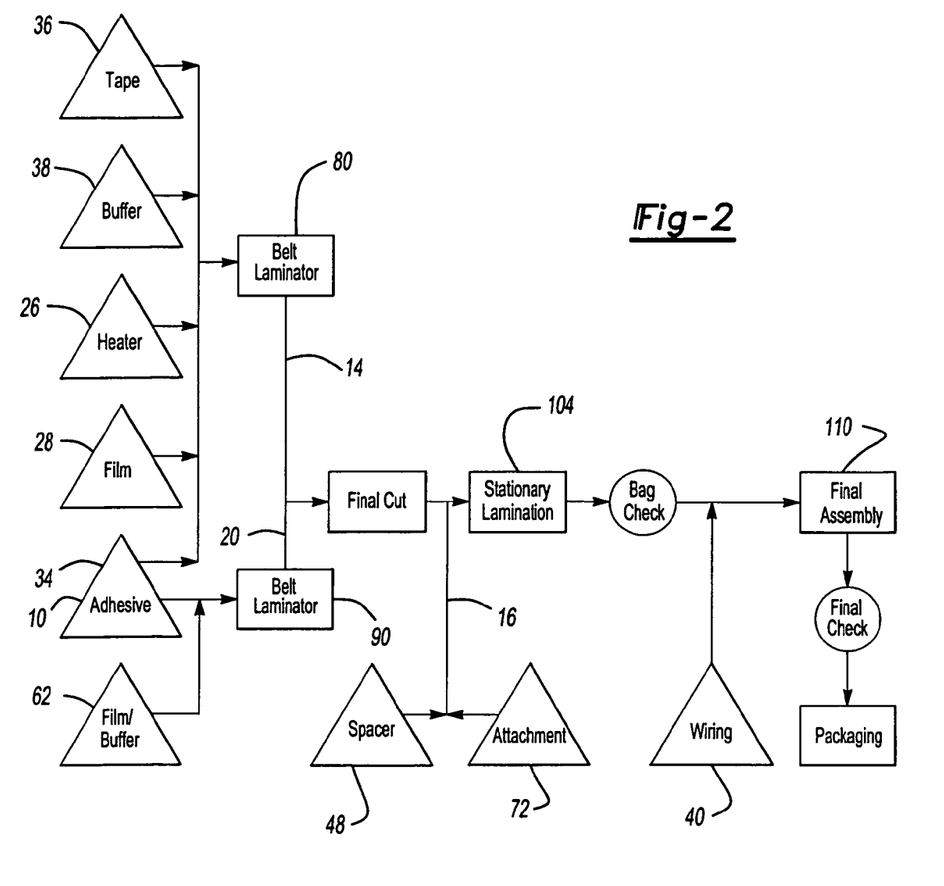
FIG. 2 is a flow diagram for producing seat inserts in accordance with an exemplary aspect of the present invention.

According to a preferred method, the sub-layers of the front or first layer and the third or rearward layer are each laminated separately followed by laminating the front layer to the rearward layer with the middle layer in between. Referring to FIGS. 1 and 2, the first layer 14 is formed according to a preferred method by feeding the various sub-layers 38, 26, 28 to a laminator 80 (e.g., a belt and roller laminator).

Although the manner in which the sub-layers 38, 26, 28 are fed to the laminator 80 may be varied, the preferred embodiment has the buffer sub-layer 38 and one of the adhesive sub-layers 34 as the outer sub-layers on the outer sides of the first layer 14. The barrier sub-layer 28 and the heater sub-layer 26 are directly inside of the outer sub-layers and, as shown, the other adhesive sub-layer 34 is between the barrier sub-layer 28 and the heater sub-layer 26. Preferably, the tape 36 is integrated into the first layer 14 between the buffer sub-layer 38 and the heater sub-layer 26 such that the tape 36 may be used to form a pocket for securing a wire harness 40 to the insert 10. It is also preferable for some amount of adhesive to be applied between and adhere the buffer sub-layer 38 and the heater sub-layer 26 to each other.

During the lamination process, it may be preferable for the laminator 80 to expose various portions of the first layer 14 to different temperatures. For the embodiment illustrated, it is preferred that the laminator 80 expose a first side of the first layer 14 (e.g., the side that includes the buffer sub-layer 38 and the heater 26) to a higher temperature while exposing a second opposite side of the first layer 14 (e.g., the side having the film sub-layer 28 and outermost adhesive sub-layer 34) to a lower temperature. Depending upon the materials used, the difference between the higher and lower temperatures is preferably between about 5° C. and about 150° C., more preferably between about 10° C. and about 100° C. and even more preferably between about 20° C. and 80° C. In this manner, the central adhesive sub-layer 34 of the first layer 14 is exposed to higher temperatures and is induced to more substantially melt and adhere the barrier sub-layer 28 to the heater sub-layer 26. At the same time, the outermost adhesive sub-layer 34 of the first layer 14 is maintained at a lower temperature than the central adhesive sub-layer 34 thereby avoiding excess melting of the outermost adhesive sub-layer 34.

Figure 3:
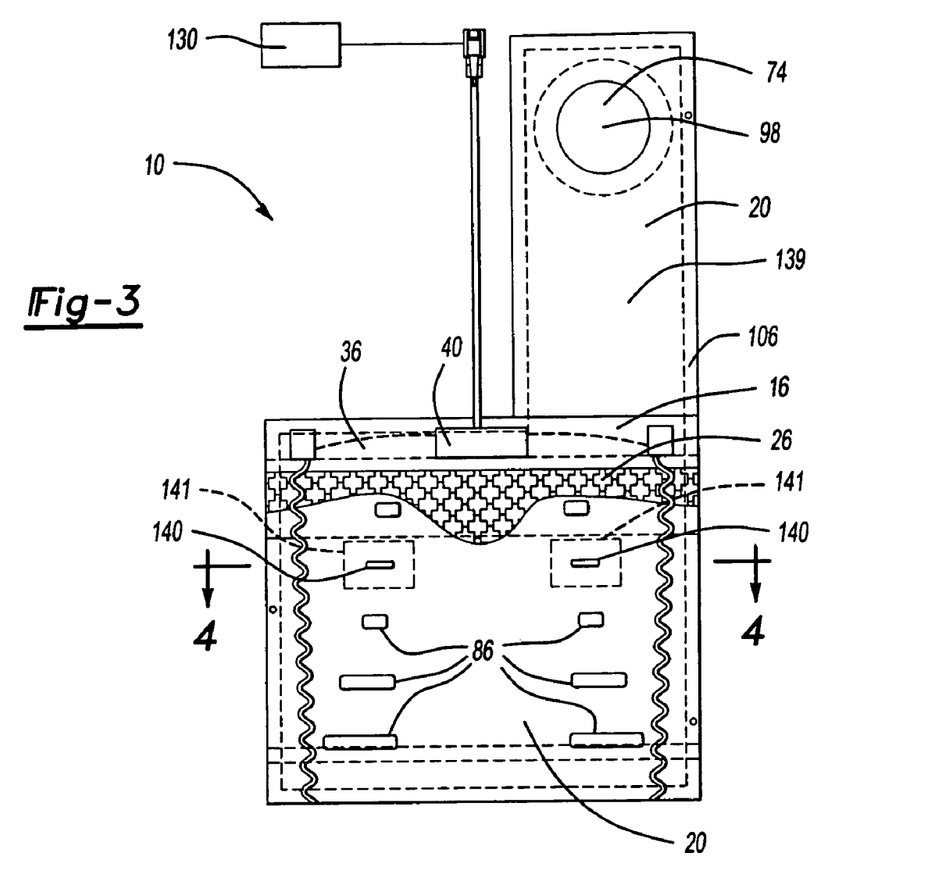
FIG. 3 is a partially cut-away elevational view of the seat insert of FIG. 1 after assembly of the insert.

The sub-layers 36, 26, 28 are preferably fed to the laminator 80 from rolls or otherwise and are cut to shape to form the first layer 14 after lamination. The first layer 14 may be cut to nearly any desired shape or configuration. In the illustrated embodiment, the first layer 14 is cut to be generally rectangular and to include an extension 84 and a plurality of through-holes 86. In FIG. 1, the through-holes 86 are arranged in a generally rectangular configuration and are each substantially the same size. In FIG. 3, however, the through-holes 86 are shown in a preferred configuration as progressively becoming larger from one side of the insert 10 to another.

Referring to FIG. 3, the through-holes 86 preferably increase in size as the distance of the holes from the blower increases. This increase in size provides a more uniform flow of air throughout the insert 10. It is believed that the increase in the total cross-sectional area of through-holes 86 as the distance from the blower increases allows air to enter or exit the openings at a more uniform rate than if the cross-sectional areas of through-holes at different distances from the blower were equal. The increase in cross-sectional area can be achieved by increasing the size of the holes, the number of holes, or a combination thereof. Finally, the increase in the cross-sectional area need not be a strict progression for each and every through-hole, rather, the through-holes in a region further from the blower should have a greater cross-sectional area than the through-holes in a region closer to the blower. Through-holes 86 may also be provided in a variety of different patterns. According to one preferred embodiment, through-holes 86 are provided in a substantially "U" shaped configuration corresponding to the legs and seat of the occupant. According to an alternative embodiment, through-holes 86 may be provided in a linear or straight line pattern (for example, to correspond to the back of an occupant) or in a variety of other patterns. Such pattern may be influenced by the portion of the seat in which the insert is used and the portion of the body of the occupant nearest the insert. According to other alternative embodiments, the number, size, shape, and pattern of through-holes 86 may vary.

The rearward layer 20, like the front layer 14, is also preferably formed by attaching it sub-layers 62, 70 in a lamination process. Referring again to FIGS. 1 and 2, the barrier sub-layer 66, the protective sub-layer 68 and the adhesive sub-layer 70 are fed to a laminator 90 (e.g., a belt laminator) such that the barrier sub-layer 66 is between and attached to the adhesive sub-layer 70 and the protective sub-layer 68. Thereafter, the rearward layer 20 is cut to have a shape substantially corresponding to the first layer 14. Of course, it is contemplated that the rearward layer may be cut into a variety of other configurations as well. Preferably, the rearward layer 20 includes a through-hole 98 as shown in FIG. 3 through an extension 100 of the rearward layer 20 that corresponds to the extension 84 of the first layer 14. It is contemplated, however, that the through-hole 98 may also be formed in the forward layer 14 if desired.

Once the middle layer 16 has been appropriately cut or otherwise shaped to the proper configuration, which preferably corresponds to the forward and rearward layers 14, 20, each of the layers 14, 16, 20 are laminated together to attach the layers 14, 16, 20 to each other. As shown, the middle layer 16 may be cut to include an extension 96 corresponding to the extensions 84, 100.

In the preferred embodiment, the layers 14, 16, 20 are laminated in a stationary lamination device 104 at elevated temperatures such that the adhesive sub-layer 70 of the rearward layer 20 and the outermost adhesive sub-layer 34 of the forward layer 14 both adhere and attach the forward layer 14 and the rearward layer 20 to the middle layer 16 (e.g., the honeycomb structure). At the same time, it is preferred that the barrier sub-layer 28 of the front layer 14 and the barrier sub-layer 66 of the rearward layer 20 be adhered to one another about an outer peripheral strip 106 of the insert 10. It is also preferred that the attachment component 72 be sandwiched and attached between at least portion of the rearward layer 20 and the middle layer 16 although the attachment component may be otherwise attached (e.g., retrofit, fastened, or the like).

The strip 106 may have a width as high as four (4) centimeters or greater. Preferably, the strip is between about 0.2 cm and about 3 cm and more preferably between about 1.0 cm and 2.0 cm. Advantageously, the adhesive sub-layers 34, 70 and the outer laminated peripheral strip 106 separately and together assist in forming the insert 10 as a tightly integrated unit wherein the layers 14, 16, 20 are substantially immobile relative to each other.

While pre-cutting the layers 14, 16, 20 followed by laminating the peripheral edges of at least two of the layers 14, 20 have been discussed, it is contemplated that cutting of the layers 14, 16, 20 and laminating of the layers may be integrated into a single processing step. For example, it is contemplated that supplies (e.g., rolls) of each of the layers 14, 16, 20 may be provided to a machine that laminates outer edges of each of the layers 14, 16, 20 together for forming the peripheral strip 106 as the supplies continuously or intermittently provide the layer 14, 16, 20 to the machine. Thus, inserts 10 may be formed by cutting the inserts 10 with the peripheral strip 106 from the laminated layers 14, 16, 20 and such cutting may be performed by the laminating machine or by another cutting machine or device. In such an embodiment, it is contemplated that the through-holes in the forward layer 14 and the through-hole in the rearward layer may be formed prior to, during or after lamination forming the outer peripheral strip 106.

Although laminating the edges of the film together and the use of adhesive layers have been found particularly advantageous, it is contemplated that other methods of attachment may also be employed in conjunction with the laminated edges or separately. For example a robot may be employed to apply a variety of adhesives such as hot-melt, heat activated, encapsulated or other types of adhesives. In one preferred alternative, an encapsulated adhesive may be applied to a first layer followed by breaking the encapsulated adhesive in close time proximity to attaching a second layer to the first layer. In other preferred embodiments, it is contemplated that the plastic films may be fused together with other techniques such as those used for book binding. Moreover, mechanical attachments (e.g., snaps, zippers, sewing, stitching, stapling or the like) may be used alone or in conjunction with the plastic films and adhesives.

Figure 5:
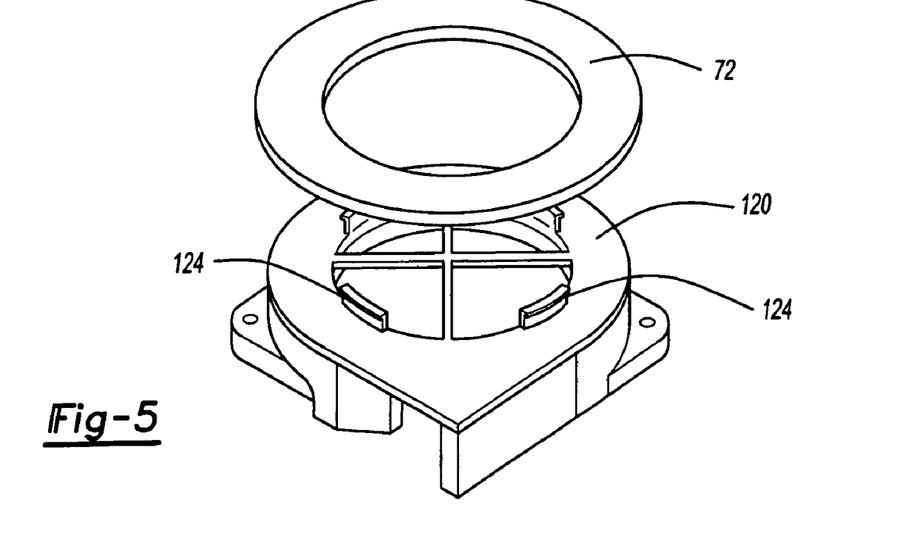
FIG. 5 is a perspective view of an exemplary blower suitable for application in the insert of the present invention.

During final assembly 110, the wire harness 40 is preferably inserted within the pocket formed by the tape 36 or otherwise attached to the insert 10. Also, a blower, the housing 120 of which is shown in FIG. 5, is preferably attached to the attachment component 72 of the insert 10. In the embodiment shown, the housing 120 include flanges 124 suitable for snap-fitting the housing 120 to the attachment component 72. In this manner, the blower can be attached to the rest of the insert 10 and can be placed in fluid communication with the through-holes 86 of the first layer 14, the open space 58 of the middle layer 16 and the through-hole 98 of the rearward layer 20. Advantageously, the attachment component 72 and flanges 124 provide a unique and efficient method of attaching the blower to the insert 10. It is contemplated however, that various other methods of attachment (e.g., fasteners, sewing, mating threaded attachments, quick connects or the like) may be used to attach the blower to the insert 10. It is also contemplated that the attachment component 72 and the housing 120 and flanges 124 of the blower may be varied within the scope of the present invention.

For assembly of the insert 10 to a vehicle seat (not shown), the insert 10 is preferably connected (e.g., sewn, adhered or otherwise attached) to a portion of the seat such as the cover (e.g., a perforated leather cover) or to a cushion (e.g., foam) of the seat. In one preferred embodiment, a seat cover may be configured to include a pocket for receiving the insert 10. Alternatively, it is contemplated that hook and loop fasteners may be utilized to attach the insert 10 to portions (e.g., the cover or foam) of the seat.

The insert 10 is preferably positioned in the seat such that the first layer 14 is closer to the outer seat cover relative to the rearward layer 20 although not necessarily required. It is also preferable for an extension 139 formed by the extensions 84, 96, 100 of the layers 14, 20 to extend behind the cushion of the seat such that the blower may be attached to a portion of the frame of the vehicle seat. Preferably, the extension 139 is a tubular structure for providing fluid communication between the open space of the spacer layer 48 and the blower. Additionally, the wire harness 40, the heater sub-layer 26, the blower or a combination thereof are preferably connected in signaling communication with a control unit 130 and/or each other. The control unit 130 may be separate from or integrated into the vehicle.

Figure 4:
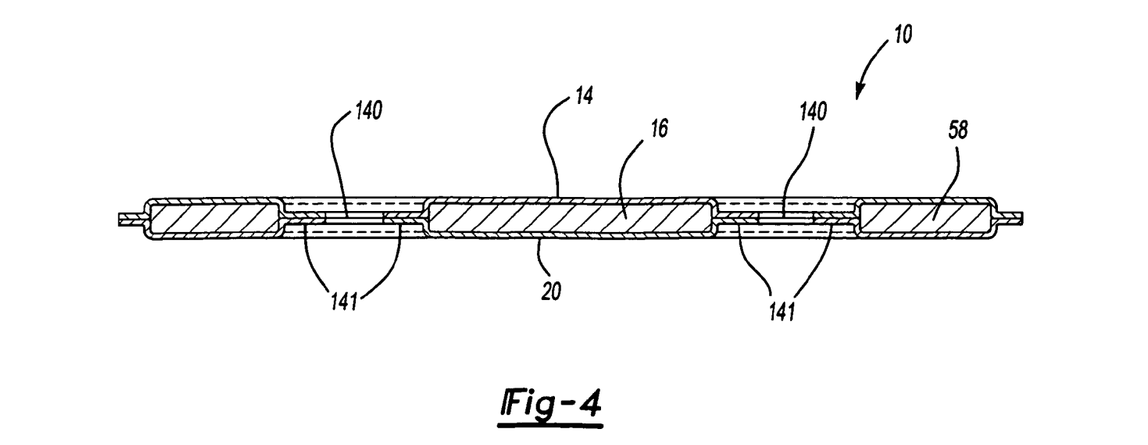
FIG. 4 is a sectional view of the insert of FIGS. 1 and 3 taken along line 4—4 in FIG. 3.
Figure 6:
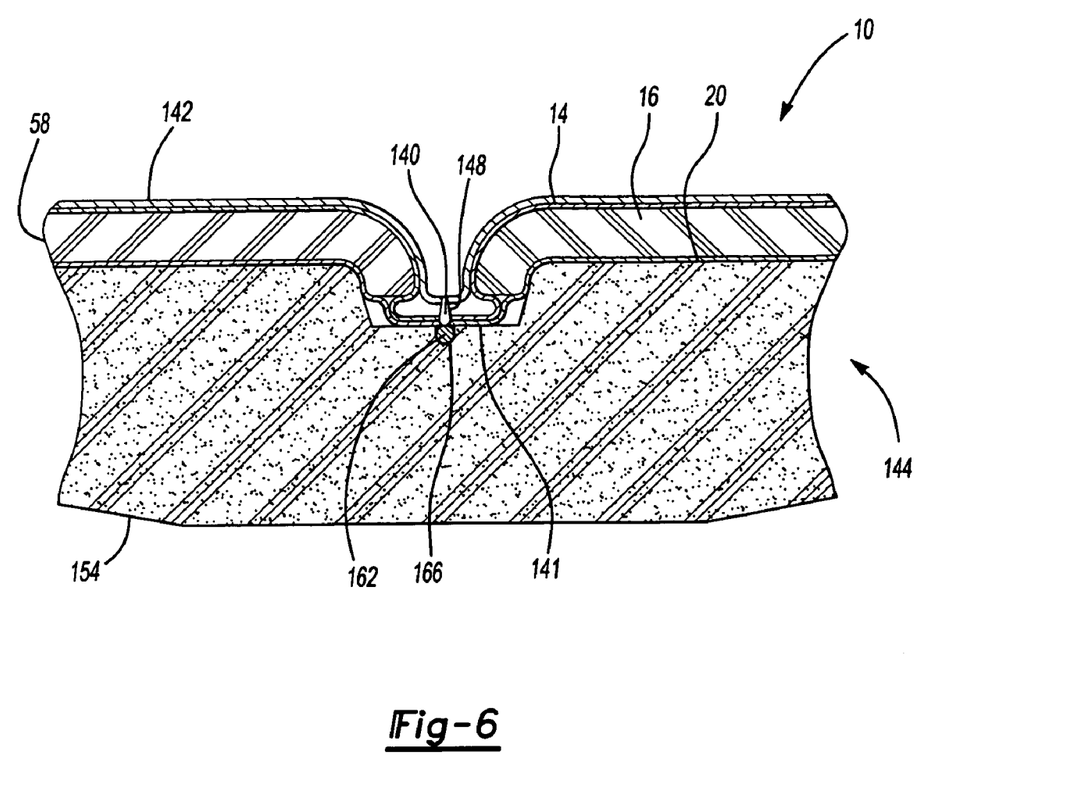
FIG. 6 is a sectional view of the insert attached in an exemplary manner to a seat of an automotive vehicle according to the present invention.

In one embodiment referring to FIGS. 3, 4 and 6, the insert 10 is formed with one or more (e.g., three) throughholes 140 that extend through the layers, sub-layers or both of the insert 10 such that the through-holes 140 extend entirely or substantially entirely through the insert 10. Preferably, the insert 10 (e.g., the barrier layers 28, 66) have a seal 141 about the through-holes 140 for substantially preventing direct fluid communication between the throughholes 140 and the open space 58 within the insert 10. In the embodiment depicted, the barrier sub-layers 28, 66 are attached to each other during the lamination process to form a substantially air-tight seal 141 about the through-holes 140.

Advantageously, the through-holes 140 can assist in the assembly of the insert 10 and/or a seat cover 142 to a seat 144 of an automotive vehicle. As shown, for each throughhole 140, a portion 148 (e.g., a cushion layer, a felt layer, a leather layer, combinations thereof or the like) of the seat cover 142 is extended through the through-hole 140 and is attached to foam 154 of the seat 144. In the embodiment depicted, the portion 148 is attached to the foam 154 by wrapping or otherwise attaching the portion 148 about a member 162 (e.g., a bar or wire) that is attached to (e.g., at least partially imbedded within) the foam 154. Additionally, one or more loops 166 (e.g., metal loops) are integrated with the portion 148 and are looped about the member 162 for assisting in attaching the portion 148 to the member 162.

It shall be appreciated that, in embodiments alternative to the one depicted, a variety of materials or members such as wire, thread, stitches, fasteners, foam or the like may extend through the through-holes 140 in the insert 10 for assisting in the attachment of the seat cover 142, the insert 10 or both to the other components of the seat 144. Moreover the materials or members may be connected to the seat cover, the foam, the seat frame, other portions of the seat or vehicle or the like depending on the desired configuration. It is also contemplated that other attachment methods such as the use of alternative fastening devices may be employed in addition to or alternative to the through-holes 140. For example, hook and loop fasteners, sewing, adhesives or other fastening devices or mechanisms may be employed to locate the insert 10 relative to the seat cushion, the seat cover 142 or both.

While it is generally preferable that the layers 14, 16, 20 be substantially coextensive with each other and that the rearward and forward layers 14, 20 form a substantially continuous seal or peripheral strip 106 about the insert 10, it is contemplated that such is not the case. Thus, it is contemplated that one or more of the layers 14, 16, 20 may be less than coextensive with each other or non-existent. For example, the rearward layer 20 alone could provide a barrier sub-layer 66 that provides a sufficient pathway for receiving air from the extension 139 and guiding air through the spacer layer to the seat cover 142 or trim layers.

Operation

In operation, the insert of the present invention can preferably provide heating, cooling, ventilation or a combination thereof to an occupant of a seat having the insert. In particular, if heat is desired, electric current can be induced to travel through the heater sub-layer 26 by the control unit 130 or otherwise such that the heater sub-layer 26 can provide heat to the occupant.

Alternatively, if cooling or ventilation is desired, the blower can be operated via the control unit 130 or otherwise to pull air through the through-holes 86 in the first layer 14 of the insert 10, through the open space 58 of the middle layer 48 of the insert 10 and through the through-hole 98 of the rearward layer 20. Such air preferably flows at least partially past the occupant of the seat and through the seat cover (e.g., a perforated leather seat cover or cloth seat cover) thereby providing ventilation to the occupant and providing convective heat transfer from the occupant to the flowing air.

Although, it may be preferable for only the heater sub-layer 26 or the ventilation system to be running at one time, it is contemplated that both may be operated simultaneously. Moreover, it is contemplated that both the heater sub-layer 26 and the ventilation system may be operated at various levels (e.g., 2 or more levels of output) such as by having a blower that can operate at different levels or by having various levels of electricity flowing thought the heater sub-layer 26. It is also contemplated that the blower may push air into the open space 58 of the insert 10 as well as pulling air from the open space 58.

It is also contemplated that one or more temperature sensors (e.g., a thermostat) may be included adjacent the insert, the trim layer or the like. Preferably, any temperature sensors are near the seat cover or the insert for sensing a temperature closely related to (e.g., at or near) a temperature being experienced by an individual in the seat. Such temperature sensors may be in signaling communication with the control unit 130 such that the control unit 130 can control the blower 22, the heater layer 28 or both for attaining or maintaining a desired temperature at areas adjacent the individual and/or the temperature sensor. Moreover, the control unit 130 may be programmed with instructions for commanding the blower 22, the heater layer 28 or both to change output levels (e.g., turn on or turn off) if the temperature sensor senses a temperature above or below one or more threshold levels. An example of such programming is described in a copending patent application titled "AUTOMOTIVE VEHICLE SEATING COMFORT SYSTEM", Ser. No. 60/428,003, filed Nov. 21, 2002 and incorporated herein by reference for all purposes.

Advantageously, the plastic film sub-layers 28, 66 respectively of the first and third layers 14, 20 provide a substantially gas-tight seal about the middle layer 16 (e.g., the spacer sub-layer 48). In this manner, gas flow to and from the open space 58 of the spacer sub-layer 48 is substantially restricted to flowing through the through-holes 86, 98 of the first and third layers 14, 20.

In a highly preferred embodiment, the through-hole 98, which may be defined by the sub-layers 66, 70 of the rearward layer 20 or by the attachment component 72, spans an area no greater than about 100 $cm^2$ or higher, more preferably between about 15 $cm^2$ to about 60 $cm^2$, even more preferably between about 25 $cm^2$ and about 40 $cm^2$ and most preferably between about 30 $cm^2$ and about 35 $cm^2$ depending upon the size of the blower. Advantageously, for maintaining more efficient flow of air, the through-holes 86 on the front layer 14 may be sized to span areas, the sum of which, is substantially similar (e.g., within 20 $cm^2$, more preferably within 10 $cm^2$ and even more preferably within 5 $cm^2$) to the area of the through-hole 98 in the rearward sub-layer 20. Additionally, the open space 58 of the middle layer 58 may be sized such that nearly any cross-section substantially perpendicular to airflow therethrough is also substantially similar (e.g., within 20 $cm^2$, more preferably within 10 $cm^2$ and even more preferably within 5 $cm^2$) to the area of the through-hole 98 in the rearward sub-layer 20.

The preferred embodiment of the present invention has been disclosed. A person of ordinary skill in the art would realize however, that certain modifications would come within the teachings of this invention. Therefore, the following claims should be studied to determine the true scope and content of the invention.

What is claimed is:

1. A comfort system for a seat of a transportation vehicle, comprising:
   an insert adapted for use with a vehicle seat, wherein:
   i. the insert includes a layer of spacer material for providing an open space within the insert;
   ii. the insert includes a first barrier layer with a plurality of first openings and a second barrier layer with a second opening, the first openings and second opening in fluid communication with the open space and the spacer material located between the first and second barrier layer;
   iii. the insert is sealed about a peripheral edge of the insert with an adhesive, a melt seal or both that seals the first barrier layer to the second barrier layer forming a peripheral strip about the insert; and
   iv. the insert includes a heater layer overlaying the layer of spacer material; and
   an air mover in fluid communication with the first openings, the second opening and the open space for moving air therethrough, wherein:
   i. a tubular structure extends to the air mover for assisting in providing the fluid communication between the air mover and the open space;
   wherein the heater layer is formed of carbon fibers overlaying the layer of spacer material.

2. A comfort system as in claim 1 wherein the insert is located beneath a seat cover.

3. A comfort system as in claim 1 wherein the air mover is located beneath a cushion of the seat.

4. A comfort system as in claim 1 wherein the air mover is configured to push air into the insert through the second opening.

5. A comfort system as in claim 1 wherein the tubular structure is of substantially smaller width than the insert and wherein the tubular structure is configured to extend behind a cushion of the seat to the air mover.

6. A comfort system as in claim 1 wherein the insert is separate from, but attached to a cushion of the seat.

7. A comfort system as in claim 1 wherein at least one through-hole extends through a central portion of the insert without being in fluid communication with the open space or the second opening.

8. A comfort system as in claim 1 wherein the spacer material is secured to the first barrier layer, the second barrier layer or both with an adhesive.

9. A comfort system as in claim 1 further comprising at least one control unit in communication with the air mover wherein the control unit is programmed with instructions for commanding the air mover to change output levels if a temperature sensor senses a temperature above or below one or more threshold levels.

10. A comfort system as in claim 1 further comprising an air permeable layer of spacer material between the insert and an occupant location of the seat for assisting in distributing air under an occupant of the seat and wherein the peripheral strip has a width of between about 0.2 cm and about 3.0 cm.

11. A comfort system as in claim 1 wherein the peripheral strip has a width of between about 1.0 cm and about 2.0 cm.

12. A comfort system as in claim 1 wherein the spacer material is formed of fabric panels, which are interconnected by polymeric strand material.

13. A comfort system for a seat of a transportation vehicle, comprising:
   an insert adapted for use with a vehicle seat, wherein:
   i. the insert includes a layer of spacer material for providing an open space within the insert;
   ii. the insert includes a first barrier layer with a plurality of first openings and a second barrier layer with a second opening, the first openings and second opening in fluid communication with the open space and the spacer material located between the first and second barrier layer;
   iii. the insert is sealed about a peripheral edge of the insert with an adhesive, a melt seal or both that seals the first barrier layer to the second barrier layer forming a peripheral strip about the insert; and
   iv. the insert includes a heater layer overlaying the layer of spacer material; and
   an air mover in fluid communication with the first openings, the second opening and the open space for moving air therethrough, wherein:
   i. a tubular structure extends to the air mover for assisting in providing the fluid communication between the air mover and the open space;
   wherein at least one through-hole extends through a central portion of the insert without being in fluid communication with the open space or the second opening.

14. A comfort system as in claim 13 wherein the insert is located beneath a seat cover.

15. A comfort system as in claim 13 wherein the air mover is located beneath a cushion of the seat.

16. A comfort system as in claim 13 wherein the air mover is configured to push air into the insert through the second opening.

17. A comfort system as in claim 13 wherein the tubular structure is of substantially smaller width than the insert and wherein the tubular structure is configured to extend behind a cushion of the seat to the air mover.

18. A comfort system as in claim 13 wherein the insert is separate from, but attached to a cushion of the seat.

19. A comfort system as in claim 13 wherein the spacer material is secured to the first barrier layer, the second barrier layer or both with an adhesive.

20. A comfort system as in claim 13 further comprising at least one control unit in communication with the air mover wherein the control unit is programmed with instructions for commanding the air mover to change output levels if a temperature sensor senses a temperature above or below one or more threshold levels.

21. A comfort system as in claim 13 wherein the peripheral strip has a width of between about 0.2 cm and about 3.0 cm.

22. A comfort system as in claim 13 wherein the peripheral strip has a width of between about 1.0 cm and about 2.0 cm.

23. A comfort system as in claim 13 wherein the spacer material is formed of fabric panels, which are interconnected by polymeric strand material.

24. A comfort system for a seat of a transportation vehicle, comprising:
   an insert adapted for use with a vehicle seat, wherein:
   i. the insert includes a layer of spacer material for providing an open space within the insert;
   ii. the insert includes a first barrier layer with a plurality of first openings and a second barrier layer with a second opening, the first openings and second opening in fluid communication with the open space and the spacer material located between the first and second barrier layer;
   iii. the insert is sealed about a peripheral edge of the insert with an adhesive, a melt seal or both that seals the first barrier layer to the second barrier layer forming a peripheral strip about the insert; and
   iv. the insert includes a heater layer overlaying the layer of spacer material; and
   an air mover in fluid communication with the first openings, the second opening and the open space for moving air therethrough, wherein:
   i. a tubular structure extends to the air mover for assisting in providing the fluid communication between the air mover and the open space;
   wherein the spacer material is secured to the first barrier layer, the second barrier layer or both with an adhesive.

25. A comfort system as in claim 24 wherein the insert is located beneath a seat cover.

26. A comfort system as in claim 24 wherein the air mover is located beneath a cushion of the seat.

27. A comfort system as in claim 24 wherein the air mover is configured to push air into the insert through the second opening.

28. A comfort system as in claim 24 wherein the tubular structure is of substantially smaller width than the insert and wherein the tubular structure is configured to extend behind a cushion of the seat to the air mover.

29. A comfort system as in claim 24 wherein the insert is separate from, but attached to a cushion of the seat.

30. A comfort system as in claim 24 further comprising at least one control unit in communication with the air mover wherein the control unit is programmed with instructions for commanding the air mover to change output levels if a temperature sensor senses a temperature above or below one or more threshold levels.

31. A comfort system as in claim 24 further comprising an air permeable layer of spacer material between the insert and an occupant location of the seat for assisting in distributing air under an occupant of the seat and wherein the peripheral strip has a width of between about 0.2 cm and about 3.0 cm.

32. A comfort system as in claim 24 wherein the peripheral strip has a width of between about 1.0 cm and about 2.0 cm.

33. A comfort system as in claim 24 wherein the spacer material is formed of fabric panels, which are interconnected by polymeric strand material.

34. A comfort system for a seat of a transportation vehicle, comprising:
an insert adapted for use with a vehicle seat, wherein:
i. the insert includes a layer of spacer material for providing an open space within the insert;
ii. the insert includes a first barrier layer with a plurality of first openings and a second barrier layer with a second opening, the first openings and second opening in fluid communication with the open space and the spacer material located between the first and second barrier layer;
iii. the insert is sealed about a peripheral edge of the insert with an adhesive, a melt seal or both that seals the first barrier layer to the second barrier layer forming a peripheral strip about the insert; and
iv. the insert includes a heater layer overlaying the layer of spacer material; and
an air mover in fluid communication with the first openings, the second opening and the open space for moving air therethrough, wherein:
i. a tubular structure extends to the air mover for assisting in providing the fluid communication between the air mover and the open space;
wherein the spacer material is formed of fabric panels, which are interconnected by polymeric strand material.

35. A comfort system as in claim 34 wherein the insert is located beneath a seat cover.

36. A comfort system as in claim 34 wherein the air mover is located beneath a cushion of the seat.

37. A comfort system as in claim 34 wherein the air mover is configured to push air into the insert through the second opening.

38. A comfort system as in claim 34 wherein the tubular structure is of substantially smaller width than the insert and wherein the tubular structure is configured to extend behind a cushion of the seat to the air mover.

39. A comfort system as in claim 34 wherein the insert is separate from, but attached to a cushion of the seat.

40. A comfort system as in claim 34 further comprising at least one control unit in communication with the air mover wherein the control unit is programmed with instructions for commanding the air mover to change output levels if a temperature sensor senses a temperature above or below one or more threshold levels.

41. A comfort system as in claim 34 further comprising an air permeable layer of spacer material between the insert and an occupant location of the seat for assisting in distributing air under an occupant of the seat and wherein the peripheral strip has a width of between about 0.2 cm and about 3.0 cm.

42. A comfort system as in claim 34 wherein the peripheral strip has a width of between about 1.0 cm and about 2.0 cm.

43. A comfort system for a seat of an automotive vehicle, comprising:
an insert adapted for use with a vehicle seat, wherein:
i. the insert includes a layer of spacer material formed of a spacer fabric for providing an open space within the insert;
ii the insert includes a first barrier layer with a plurality of first openings and a second barrier layer with a second opening, the first openings and second opening in fluid communication with the open space and the spacer material located between the first and second barrier layer;
iii. the insert is sealed about a peripheral edge of the insert with an adhesive, a melt seal or both that seals the first barrier layer to the second barrier layer forming a peripheral strip about the insert that extends outwardly from the insert; and
iv. the insert includes a heater layer overlaying the layer of spacer material, the heater layer including resistive wires laminated to a fabric; and
an air mover in fluid communication with the plurality of first openings, the second opening and the open space for moving air therethrough, wherein:
i. a tubular structure extends to the air mover for assisting in providing the fluid communication between the air mover and the open space; and
ii. the air mover is configured to push air into the insert through the second opening;
wherein the spacer material is secured to the first barrier layer, the second barrier layer or both with an adhesive.

44. A comfort system as in claim 43 wherein the heater layer is formed of carbon fibers overlaying the layer of spacer material.

45. A comfort system as in claim 43 wherein the insert is separate from, but secured to a cushion of the seat with an adhesive.

46. A comfort system as in claim 43 wherein the spacer material is formed of fabric panels, which are interconnected by polymeric strand material.

47. A comfort system for a seat of an automotive vehicle, comprising:
a cushion of the seat of the automotive vehicle;
an insert overlaying the cushion of the seat, wherein:
i. the insert includes a layer of spacer material formed of a spacer fabric structure for providing an open space within the insert, the spacer fabric structure including opposing honeycomb panels interconnected with polymeric strand material;
ii. the insert includes a first forward plastic barrier layer with a plurality of first openings and a second rearward plastic barrier layer with a second opening, the first openings and second opening in fluid communication with the open space and the spacer material located between the first and second barrier layer;
iii. the insert is sealed about a peripheral edge of the insert with an adhesive, a melt seal or both that seals the first barrier layer to the second barrier layer forming a peripheral strip about the insert, the peripheral strip extending outwardly from the insert;
iv. the insert includes a heater layer overlaying the layer of spacer material, the heater layer including carbon fibers secured to a fabric with an adhesive;
v. the heater layer is laminated to the first or second barrier layer with an adhesive; and
vi. the insert is secured to the cushion with an adhesive;
an air mover in fluid communication with the plurality of first openings, the second opening and the open space for moving air therethrough, wherein:
i. a tubular structure extends to the air mover for assisting in providing the fluid communication between the air mover and the open space;
ii. the air mover is configured to push air into the insert through the second opening;
iii. the air mover is secured to a frame of the seat of the vehicle;
an air permeable layer of spacer material between the insert and an occupant location of the seat for assisting in distributing air under an occupant of the seat.

48. A comfort system as in claim 47 wherein the spacer material is secured to the first barrier layer, the second barrier layer or both with an adhesive.

* * * * *